United States Patent

[11] 3,588,856

| [72] | Inventors | Douglas M. Bauer<br>Danvers;<br>Martin J. Nagel, Lynn, Mass. |
|---|---|---|
| [21] | Appl. No. | 745,504 |
| [22] | Filed | July 17, 1968 |
| [45] | Patented | June 28, 1971 |
| [73] | Assignee | General Electric Company |

[54] FAILURE WARNING SYSTEM
5 Claims, 3 Drawing Figs.

[52] U.S. Cl. ................................................ 340/181,
340/187, 340/248B
[51] Int. Cl. ...................................................... G08b 19/00,
G08b 5/24
[50] Field of Search............................................ 340/181,
412, 187

[56] References Cited
UNITED STATES PATENTS
2,756,410  7/1956  Tobias.............................. 340/181

| 3,154,775 | 10/1964 | Gherst.......................... | 340/412 |
| 3,210,749 | 10/1965 | Magor.......................... | 340/181 |
| 3,293,605 | 12/1966 | Moore........................... | 340/412 |
| FOREIGN PATENTS | | | |
| 1,064,630 | 9/1959 | Germany....................... | 340/181 |

*Primary Examiner*—Thomas B. Habecker
*Attorneys*—Richard E. Hosley, Frank L. Neuhauser, Oscar B. Waddell and Melvin M. Goldenberg

ABSTRACT: An indicating instrument failure warning circuit for energizing a failure warning mechanism. A timing circuit is responsive to a decrease in or a presence of diverse condition signals to turn off a switching transistor. A decrease in the power supply voltage causes a Zener diode to block base current to the switching transistor thereby turning it off. A voltage decrease at a power supply energizing the failure warning mechanism or turning off the switching transistor produces a failure warning.

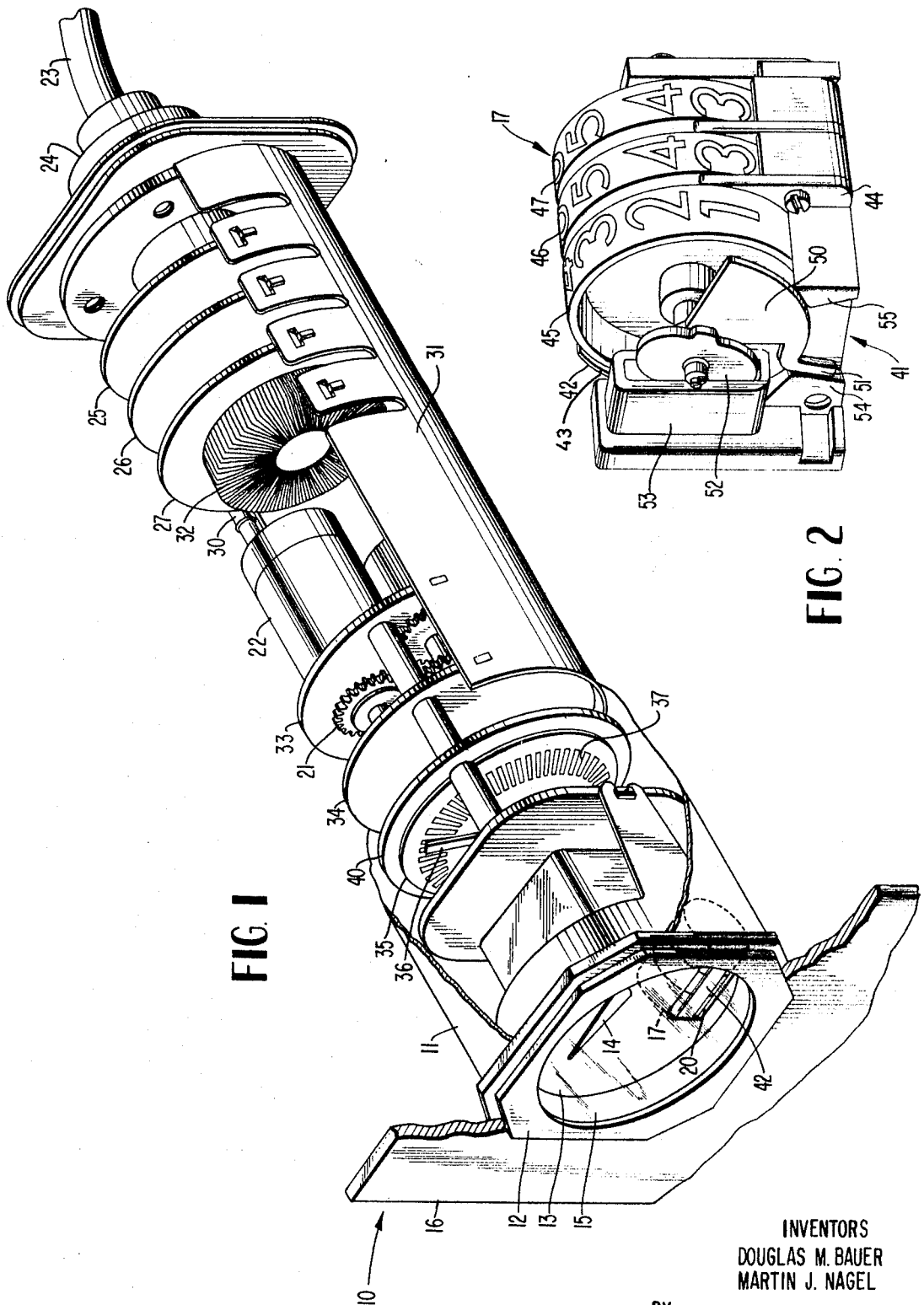

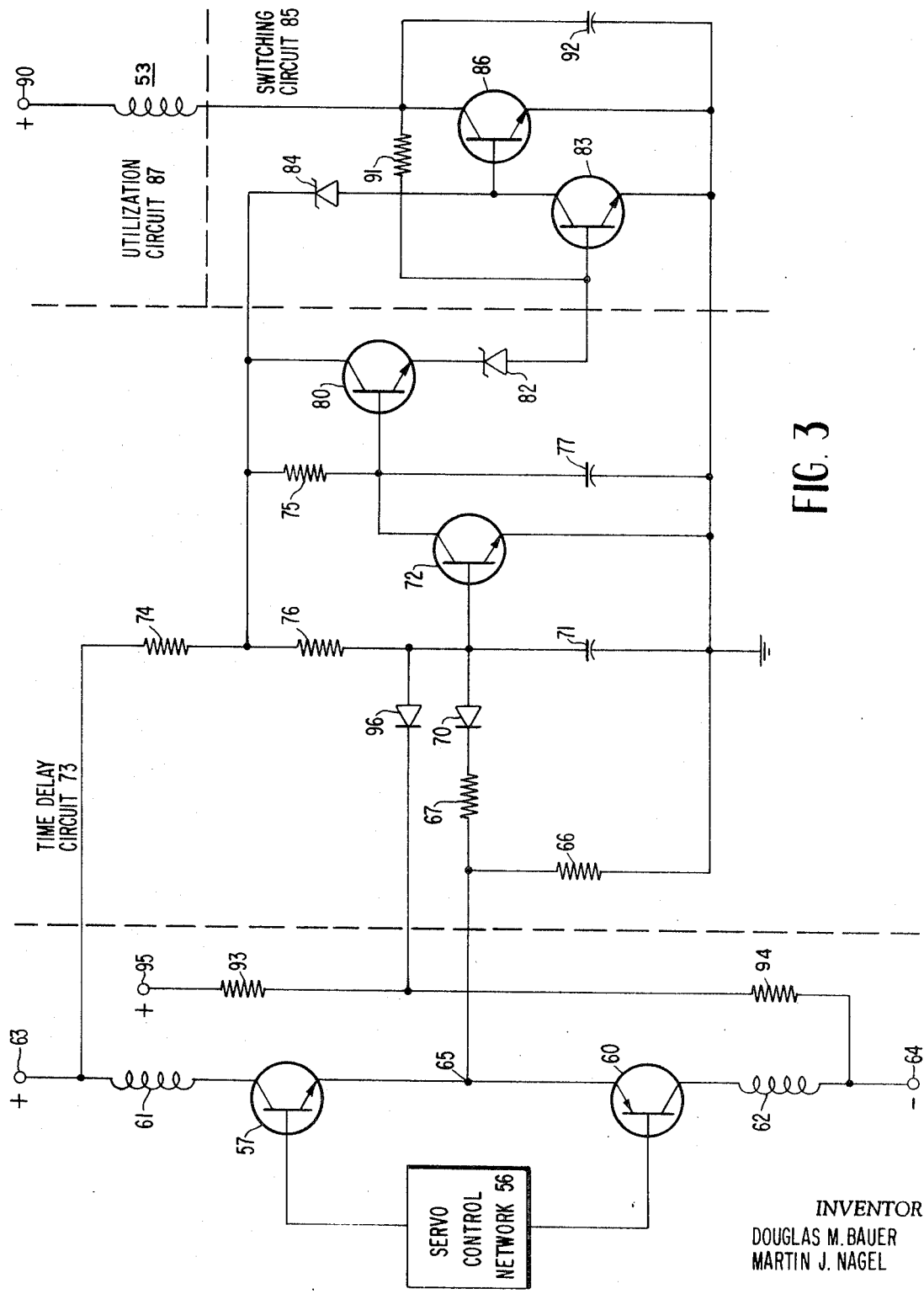

3,588,856

FAILURE WARNING SYSTEM

BACKGROUND OF THE INVENTION

This invention relates to failure warning systems and more specifically for internal condition monitoring means for indicating instruments.

Indicating instruments to be used in applications requiring a high degree of reliability often require internal operating condition monitoring to assure that a displayed condition is a true representation of an actual condition. In these instruments many electrical, electronic, electromechanical and mechanical elements mutually cooperate to provide an errant indication. A failure in any of these elements can provide an errant indication. For example, a power supply voltage decrease or failure to balance a servo-operated indicating instrument may cause an inaccurate indication. Finally, it is also possible that the failure warning indicator or associated circuitry could be inoperative.

Some failure systems monitor an indicating instrument to initiate an alarm either after a predetermined time delay or immediately upon the occurrence of an adverse condition. These systems have not generally been adapted for sensing a plurality of conditions whereby certain adverse conditions produce a failure indication only after a predetermined time delay while other adverse conditions indicate a failure instantaneously. In addition, these systems have not generally been responsive to failures in their own power supplies to provide a failure indication.

Therefore, it is an object of this invention to provide an improved failure warning system for an indicating instrument.

Another object of this invention is to provide a failure warning system for an indicating instrument which monitors a plurality of conditions.

Still another object of this invention is to provide a failure warning system for an indicating instrument which is responsive to certain adverse conditions only after a predetermined time delay.

Yet another object of this invention is to provide a failure warning system for an indicating instrument which is instantaneously responsive to adverse conditions.

Still another object of this invention is to provide a failure warning system for an indicating instrument which is responsive to its own failure.

SUMMARY OF INVENTION

In accordance with one aspect of this invention, a failure warning system is connected to sense one condition and produce a control signal only after a predetermined time delay. A switching means responds to the failure after the time delay to indicate the failure. The switching means also is responsive to a power supply failure or, with a failure warning indicator, to a failure of the indicator power supply, instantaneously. When the switching means responds, the failure warning indicator is moved to an alarm position.

This invention has been pointed out with particularity in the appended claims. A more thorough understanding of the above and further objects and advantages of this invention may be attained by referring to the following detailed description taken in conjunction with the accompanying drawings.

BRIEF DESCRIPTION OF THE DRAWINGS

FIG. 1 is a perspective view of an indicating instrument which incorporates this invention;

FIG. 2 is a perspective view of one embodiment of a failure warning indicator mechanism to be responsive to a circuit constructed in accordance with this invention; and FIG. 3 is a schematic representation of a specific electronic circuit constructed in accordance with this invention.

DESCRIPTION OF AN ILLUSTRATIVE EMBODIMENT

Referring to the FIGS. where like numerals referred to like elements throughout, one embodiment of a condition responsive indicating instrument generally designated by numeral 10 is shown in FIG. 1 with most of its housing 11 removed. Such an instrument generally includes a visible portion including a flange 12, a scale plate 13, a condition indicating pointer 14 and a transparent dial face 15 over the scale plate 13 and the condition indicating pointer 14. This assembly is mounted on the front surface of a panel 16. These elements constitute a condition indicating instrument which provides a reading when the pointer 14 is driven along the scale plate 13 in response to a driving signal.

Means for providing the driving signal are disposed behind the panel 16 and within the housing 11. As various means for driving the indicating pointer 14 including circuitry and mechanical elements for such a system are known in the art, they are only shown in outline. The indicating pointer 14 and a counter 17, disposed behind the scale plate 13 and normally visible through an aperture 20, are driven through a gear mechanism 21 by a servomotor 22. The servomotor 22 is driven in response to sensor signals coupled to the indicating instrument 10 by a cable 23 which is attached to a connector assembly 24 and then coupled to the electronic circuits formed on a plurality of printed circuit boards 25, 26 and 27 interconnected by internal cable means 30 and maintained in position by support means 31.

As specifically illustrated in FIG. 1, a power transformer 32 is mounted to the circuit board 27 and this is connected through a cable means 30 and circuitry on the circuit boards to the servomotor 22 which is mounted on a support plate 33. The servomotor 22 drives a shaft to turn the condition indicating pointer 14 through the gear mechanism 21 which is mounted between the support plates 33 and 34. A position sensitive potentiometer 35, including a slider 36 coupled to the shaft and a resistive element 37, is mounted on a support plate 40 to produce a balancing feedback signal for the servometric positioning system which is of the null balance type.

Internal failures in the system are indicated by the mechanism specifically illustrated in FIG. 2. The counter 17 has a failure indicating assembly 41 connected thereto so that a failure in the system will cause interference with the counter reading through the aperture 20 in the scale plate 13. An opaque part 42, also shown in FIG. 1, on a flag portion 43 of the failure indicating assembly 41 is disposed in front of the counter 17. In FIG. 2 the counter comprises a support 44 upon which three counter dials 45, 46 and 47 are mounted for rotation. These dials are conventionally driven by a gear assembly which is not shown but which is mounted to the support 44.

The failure indicating assembly 41 comprises an integral member 50 which includes the flag portion 43 and a stop 51. The integral member 50 is mounted for rotation about an axis through the counter 17 and is affixed to a rotor magnet 52. An electromagnetic coil 53 is also mounted to the support 44 to be partially coextensive with the rotor magnet 52. An internal permanent magnet is coaxially mounted with respect to the electromagnetic coil 53 and oriented to produce a reversible electromagnetic field dependent upon the energization of the electromagnetic coil 53. The rotor magnet 52 is elongated along a polar axis substantially perpendicular to the magnetic axis of the reversible electromagnetic field. Rotation of the integral member 50 is limited by engagement of the stop 51 with two stop extensions 54 and 55 formed on the support 44. FIG. 2 illustrates the failure indication produced when the electromagnetic coil 53 is deenergized. The opaque portion 42 is positioned as illustrated in FIGS. 1 and 2 to thereby interfere with the reading of the counter 17. However, when the electromagnetic coil 53 is energized, the rotor swings to a new position whereupon the flag portion 43 is pivoted away from the aperture 20 in the scale plate 13.

FIG. 3 schematically presents an electronic circuit which is capable of monitoring a plurality of electrical operating conditions. This particular circuit is responsive to excessive off null operation of the servosystem and also to low voltage of another power supply, of its own power supply, and the power supply energizing the electromagnetic coil 53. Detection of excessive off null operation requires a connection to the servosystem. For purposes of illustration, a system might comprise a servocontrol network 56 which controls an NPN transistor 57 and a PNP transistor 60 which are connected in series with control windings 61 and 62 mounted on the servomotor such as the servomotor 22 shown in FIG. 1. This series circuit is energized by a power supply which produces a positive voltage at a terminal 63 and a negative voltage at a terminal 64. When the servo indicator is balanced, no voltage appears at a junction 65 formed by the two emitters. When the servosystem is off null, an AC voltage appears at the junction 65 and across a resistor 66 connected between the junction 65 and ground. Negative-going half cycles of this AC voltage are rectified through a resistor 67 and a diode 70 to be filtered by a capacitor 71. The capacitor 71 is parallel with the base-emitter junction of a timing transistor 72 which constitutes a portion of a time delay circuit 73. Bias for the timing transistor 72 is supplied by resistors 74 and 75 in series with the collector. Another resistor 76 biases the base electrode of the timing transistor 72 and is connected to the junction of the resistors 74 and 75. If no voltage appears at the junction 65, the timing transistor 72 is saturated.

When the timing transistor 72 conducts, a timing capacitor 77 is shunted. A voltage at the junction 65 drives the base negatively to turn off the timing transistor 72 thereby allowing the timing capacitor 77 to charge through the resistors 74 and 75. A transistor 80 has its collector connected to the junction of the resistors 74 and 75 while its emitter electrode is connected through a Zener diode 82 to the base of a grounded emitter transistor 83. The collector of this transistor is connected to the collector of the transistor 80 by a Zener diode 84. Proper selection of the charging circuit time constant and the Zener diode 82 delays the firing of the transistor 80 for a predetermined time interval. When the timing capacitor 77 charges to a voltage which exceeds the Zener diode breakdown voltage and the forward voltage drop of the base-emitter junction of the transistor 80, that transistor and the transistor 83 conduct. Therefore, its collector goes substantially to ground.

A switching circuit 85 including the transistor 83, the Zener diode 84 and a transistor 86 controls the action of a utilization circuit 87 including, in this specific embodiment, the electromagnetic coil 53 which is adapted to be energized from a power supply represented by a positive terminal 90. When the transistor 83 is turned on, representing an adverse condition, the switching transistor 86 is turned off thereby deenergizing the electromagnetic coil 53. A positive feedback resistor 91 couples the collector of the switching transistor 86 to the base of the transistor 83. When the switching transistor 86 is not conducting, the voltage at the collector is transferred to the base of the transistor 83 to assure continued conduction thereof. Similarly, when the switching transistor 86 conducts, the feedback voltage assures continued nonconduction of the transistor 83. An optional capacitor 92 shunting the collector and emitter electrodes of the switching transistor 86 permits the electromagnetic coil 53 to be energized by a full-wave rectified, unfiltered voltage. The capacitor 92 provides a sustaining current for the switching transistor 86 during the entire half cycle. In addition, it maintains the feedback voltage developed by the resistor 91 at the base of the transistor 83.

A monitoring circuit adapted for indicating a failure of another power supply is shown in FIG. 3. This circuit includes a voltage divider comprising resistors 93 and 94 connected in series between the negative terminal 64 and a positive terminal 95 of the power supply being monitored. The junction of the voltage divider is connected to the base of the timing transistor 72 through diode 96. Therefore, when the voltage at the terminal 95 drops significantly, the timing transistor 72 is turned off. It will be obvious that other sources could be monitored by similar circuits in parallel with this particular circuit.

In accordance with this invention, if all monitored conditions are in their normal operating modes or ranges, the timing transistor 72 and the switching transistor 86 conduct while the transistors 80 and 83 are off. The electromagnetic coil 53 is thereby energized and the flag portion 43 is positioned so that opaque part 42 is withdrawn from the aperture 20 in the scale plate 13 shown in FIG. 1.

When the servo indicator if off null or when the condition being monitored through the terminal 95 drops below a predetermined value, the timing transistor 72 turns off. If the situation is transient and corrected within a predetermined time period, the timing transistor 72 conducts and discharges the timing capacitor 77. If no correction occurs, the timing capacitor 77 charges and turns on the transistors 80 and 83. As a result, the switching transistor 86 is turned off. The deenergization of the electromagnetic coil 53 causes the opaque part 42 to appear in the aperture 20.

If the voltage from the power supply for the circuit in FIG. 3 at the junction of the resistors 74 and 76 decreases below a minimum operating value, the voltage drop across the Zener diode 84 falls below its breakdown voltage. Therefore, the Zener diode 84 blocks current to the base of the switching transistor 86 and deenergizes the electromagnetic coil 53. A failure of the power supply energizing the utilization circuit 87 at the terminal 90 also deenergizes the electromagnetic coil 53 instantaneously so that the opaque part 42 appears in the aperture 20.

Summarizing, the circuit in FIG. 3 can be readily adapted for use with the failure warning indicator shown in FIG. 2 and these combine in an indicating instrument as shown in FIG. 1 to provide a highly reliable failure warning circuit. Various parameters can be monitored to provide, on a selective basis, an instantaneous indication of certain parameters of an indication of a failure only after a predetermined time delay. In addition, the circuit is self-monitoring. While only one embodiment of a failure warning circuit has been described in reference to a specific failure warning indicating system, it will be obvious to those of ordinary skill in the art that many modifications can be made to this system. Different timing circuits and switching circuit configurations can be evolved for different operating situations. Other modifications may also be made to provide the input to the time delay circuits. Certain of the elements specifically shown in FIG. 3 may be eliminated for certain applications without adversely affecting the overall system operation. Therefore, it is an object of the appended claims to cover all such modifications and variations which fall within the true spirit and scope of this invention.

What is claimed as new and desired to be secured by Letters Patent of the United States is:

We claim:

1. In an indicating instrument adapted for energization by a power supply and including a null balance servo indicator coupled to a sensor for producing a signal to energize the indicator and a balancing feedback signal means to produce a null balance of the indicator and a normally energized failure warning indicator, the improvement of a failure warning circuit for energizing the failure warning indicator during normal operation to maintain it in a nonindicating position when the servo indicator is balanced and the power supply voltage is above a predetermined minimum, said failure warning circuit comprising:

a. a terminal coupled to the null balance servo indicator, the potential at tee terminal being at zero during balanced conditions and varying transiently for a predetermined time period as the null balance servo indicator is rebalanced;

b. a timing circuit including a first, normally conductive transistor shunting a timing capacitor, said first transistor being rendered nonconductive when the servo indicator is unbalanced, and a second, grounded emitter transistor coupled to said timing capacitor to render said grounded emitter transistor conductive in response to a predetermined voltage on said timing capacitor, the time constant of said timing circuit being of magnitude such that the voltage on said capacitor is insufficient to render said grounded emitter transistor nonconductive if the voltage at said terminal varies for said predetermined time required for rebalancing of said null balancing servo and charges to a voltage sufficient to render said grounded emitter transistor nonconductive only if there is voltage at said input terminal for a sufficient time interval to indicate a failure in said servo indicator;

c. a third, normally conductive switching transistor coupled to said second transistor, conduction of said second biasing said third transistor third transistor to terminate its conduction, said third transistor including a base electrode;

d. voltage reference means connected to said second transistor and the base electrode of said third transistor to block current to said third transistor base electrode at a predetermined minimum power supply voltage to thereby render said switching transistor nonconductive; and e. failure warning indicator coupled to said third responsive to nonconduction thereof to position the failure warning indicator in an indicating position, whereby the said failure indicating means responds immediately to a power supply low voltage condition and after a predetermined time delay to prevent an erroneous indication due to potential variations caused by rebalancing of the servo indicator.

2. An indicating instrument as recited in claim 1 including a resistor and rectifier network connected to said first transistor base electrode and adapted for connection to the servo indicator to have an AC signal impressed thereon during off null operation, said resistor and rectifier network generating a DC emitter-base bias for causing said first transistor to be turned off.

3. An indicating instrument as recited in claim 1 additionally responsive to another condition after the time delay comprising a second condition coupling diode connected to said timing circuit transistor and a voltage divider energized by the condition signal having an intermediate point thereon connected through said coupling diode to said timing circuit transistor.

4. An indicating instrument as recited in claim 3 wherein said third transistor is shunted by a capacitor connected to the emitter and collector electrodes and a resistor connects said third transistor collector electrode to said second transistor base electrode to thereby provide positive feedback whereby positive switching of said utilization means is provided when said utilization means is energized by a rectified AC power supply.

5. In an indicating instrument adapted for energization by a power supply and including a null balance servo indicator coupled to a sensor for producing a signal to energize the indicator and a balancing feedback signal generating means to produce a null balance of said indicator and a normally energized failure warning indicator, the improvement of a failure warning circuit for energizing the failure warning indicator during normal operation to maintain it in a nonindicating position when the servo indicator is balanced and the power supply voltage is above a predetermined minimum, said failure warning circuit comprising:

a. a terminal coupled to the null balance servo indicator, the potential at the said terminal being at zero during normal balance conditions of said indicator and varying transiently for a predetermined time period as the null balance servo indicator is rebalanced;

b. time delay circuit means coupled to said terminal for producing a control voltage in response to the potential at said input terminal only in the event that the potential at the said input terminal is other than zero for a time interval in excess of said predetermined time interval required to rebalance the null balance servo indicator;

c. a normally conductive switching transistor means having a base input electrode coupled to said time delay circuit means and responsive to said control voltage to drive the said switching transistor into the nonconducting state in response to a failure in said null balance servo indicator;

d. voltage reference means also coupled to the base of said switching transistor means and to the supply voltage to block current to said switching transistor base electrode at a predetermined minimum supply voltage to drive said switching transistor into the nonconducting state in response to a low voltage condition in the power supply; and e. failure warning indicating means coupled to said switching transistor means, said indicating means being deenergized when said switching means is switched into the nonconducting state to position the indicating means in an indicating position whereby the said failure indicating means responds immediately to low voltage condition in the power supply and only after a predetermined time delay to prevent an erroneous indication due to potential variations caused by rebalancing of the null balancing servo indicator.